Oct. 26, 1937.  W. S. BACHMAN  2,097,092
APPARATUS FOR DISPENSING HYPOCHLORITES
Filed Nov. 29, 1935
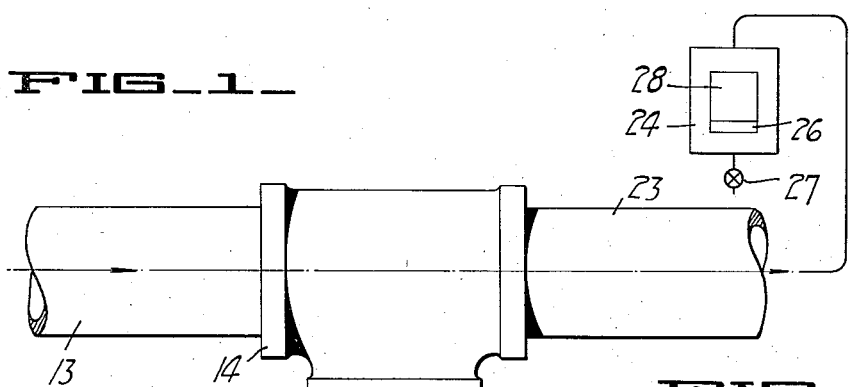
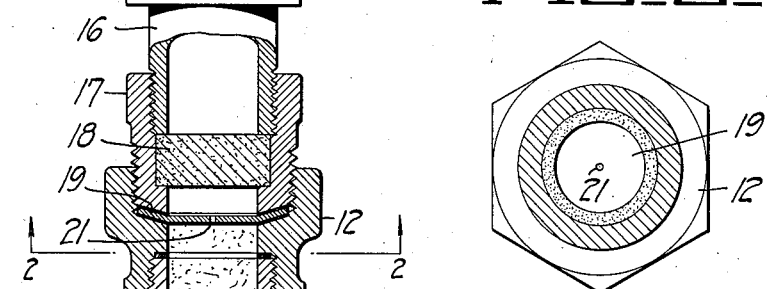
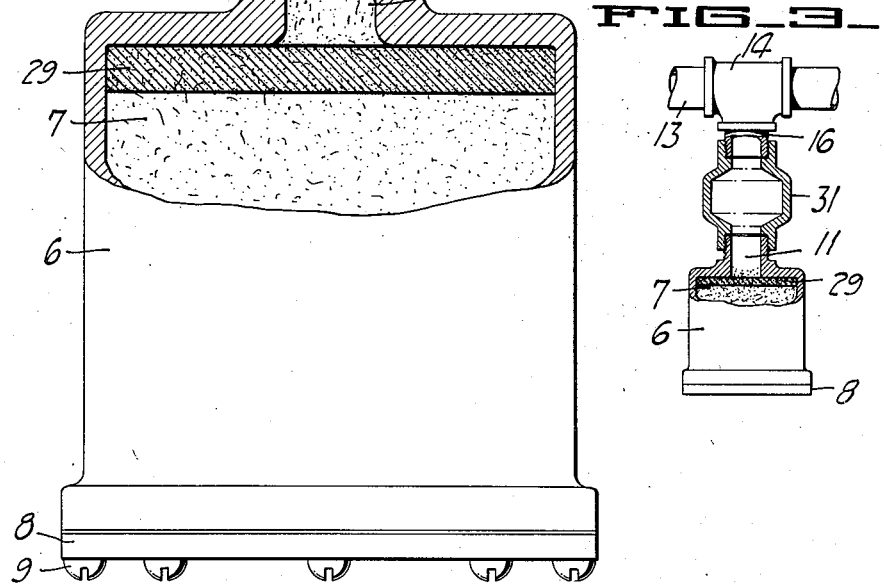
INVENTOR.
Walter S. Bachman
BY Robert N. Eerhoff.
ATTORNEY.

Patented Oct. 26, 1937

2,097,092

UNITED STATES PATENT OFFICE 2,097,092

APPARATUS FOR DISPENSING HYPO-
CHLORITES

Walter S. Bachman, Los Angeles, Calif.

Application November 29, 1935, Serial No. 52,207

4 Claims. (Cl. 210—28)

This invention relates to an apparatus for dispensing hypochlorites. Particularly it relates to an apparatus for applying the hypochlorite pellet disclosed in my copending application Serial No. 722,737 now Patent No. 2,023,459 of December 10, 1935 to the sterilization of water. As will be found upon reference to that patent, the pellet comprises a mass of calcium hypochlorite bonded together with a cementing material so that a substantially stable pellet is secured. While the pellet is useful upon direct application to water, I have found that it could be successfully employed to sterilize water by releasing to the water a substantially constant supply of hypochlorite. The pellet has proven particularly useful in combination with a water filter of the type disclosed in my Patents No. 1,321,586, No. 1,435,790 and No. 1,534,256. These filters, mentioned as typical of a vast number of water filters, are constructed to include a filtering medium, usually a composition filter stone. Under continued use, the stone becomes coated with a bacterial slime. The conditions existing about the stone are usually favorable to bacterial growth and the stone may therefore become an objectionable source of infection. By releasing a substantially small constant amount of hypochlorite to the water I have found that the stone can be maintained sterile and the bacteria growth prevented. I am not the first to discover the sterilizing efficacy of hypochlorites, particularly as applied to water supplies but the apparatus of the present invention enables hypochlorites to be advantageously released in a simple, facile and economical manner.

It is an object of the present invention to devise an apparatus for supplying hypochlorites to domestic water supplies.

Another object of the present invention is to provide an apparatus easily connected to a water supply for releasing a sterilizing agent to sterilize a water filter.

The invention includes numerous other objects and features of advantage which will become apparent upon consideration of the following wherein the present preferred form of apparatus for releasing hypochlorites has been disclosed.

In the drawing accompanying and forming a part hereof I have detailed a present preferred form of the apparatus but it is to be understood that various other forms can be adopted within the scope of the claims.

In the drawing Figure 1 is a side view partly in section.

Figure 2 is a view on the line 2—2 of Figure 1.

Figure 3 is another form of apparatus.

In the drawing I have shown the apparatus as comprising a container 6 in which is placed a pellet 7 constructed preferably after the manner of my aforementioned pellet patent. The container includes a removable cover 8 held in place by suitable means as screws 9 to provide a fluid tight container. The container includes a passageway defined by a threaded extension 11 upon which is screwed a fitting 12.

A water supply line 13 includes a T fitting 14 from which extends a nipple 16. Upon this nipple is screwed a fitting 17. This fitting provides a receptacle for a filter medium such as a porous block of carbon 18. The filter prevents foreign matter from the water line settling into the hypochlorite body and prevents undissolved portions of the hypochlorite body from passing into the water supply line.

To assist in control of the rate of evolution of the hypochlorite and for other reasons which will presently appear I attach to fitting 17 a disc 19. This disc is usually of silver and includes an aperture 21 through which the hypochlorite is released.

The T fitting 14 is also connected by a pipe 23 to some device utilizing the water. In Figure 1 I have shown the pipe 23 connected in diagrammatic manner to a filter 24 including a filter stone 26 and a faucet 27. When the faucet is opened water is drawn out of the filter 24. The withdrawn water is replaced by other water from line 13, the opening of the faucet 27 resulting in a reduction in pressure in line 13 and consequently a release of hypochlorite from container 6. The small aperture 21 prevents localized eddy current circulation of the hypochlorite and thus prevents diffusion of the hypochlorite to the water in line 13, while the pressure in line 13, when faucet 27 is closed, causes the hypochlorite to remain in container 6. Upon release of pressure on opening of faucet 27, hypochlorite is released in a very small dosage through the aperture 21 to mix with the water in pipe 13 which is passing to the filter stone 26. This small but constant dosage is sufficient to maintain the filter stone or other filter medium in good condition so that it does not become objectionable.

The filter and its filter stone have been cited as one means with which the apparatus of the present invention is particularly useful. While this use is of special importance and presents special problems, the device of the present invention can be employed in other combinations.

For example, the apparatus can be used to supply a small dosage of hypochlorite to a domestic water system generally or to any particular portion thereof as to a toilet or other fixture.

Where the water supply is used substantially constantly and in large amounts, as that used to supply a swimming pool, the aperture 21 can be made rather large or the disc and block 18 can be omitted since the absence of intermittent operation does not affect the apparatus to such a degree. In fact disc 19 and block 18 can be omitted entirely if a secondary chamber 31 is placed between the water line and the container 6. In Figure 3 this chamber is shown as a surge chamber connected to nipple 16 and to nipple 32 carried by chamber 6. Apparently the increase and decrease in pressure occurring when the water faucet 27 is opened results in a working of the concentrated hypochlorite solution in container 6 and a diffusion into chamber 31 from whence the solution is released steadily and at a nearly constant rate into the water line.

In those instances wherein the use of water is largely intermittent, I have found it to be of advantage at times to include a medium reacting with or acting upon chlorine, chlorphenols or other like taste imparting chemicals or bodies. In practice I have found a body 28 of adsorbent char, as activated bone char, to be of assistance, particularly if filter 26 is of porous carbon.

In some cases I have found it of advantage to guard the hypochlorite pellets with a layer 29 of a material as sponge rubber. This acts as a filter medium to hold in any cement or gypsum. In those cases where a minor flow of water is diverted to pass through my pellet and is then mingled with the major flow, a sponge rubber layer is placed at both ends or the pellet is encased in the rubber.

I claim:

1. A hypochlorite feeder for attachment to a water line comprising a closed vessel providing a chamber for reception of a hypochlorite as a calcium hypochlorite pellet, said vessel having only a single restricted opening therein and being positioned below said water line, a layer of sponge rubber in said vessel between said pellet and said opening, a conduit connecting said vessel opening to said water line, said conduit extending substantially vertically from said vessel to said water line and a surge chamber between said line and said vessel of a cross-sectional area larger than that of said conduit.

2. A hypochlorite feeder for attachment to a water line comprising a closed vessel providing a chamber for reception of a hypochlorite as a calcium hypochlorite pellet, said vessel having only a single restricted opening therein and being positioned below said water line, a layer of sponge rubber in said vessel interposed between said pellet and said opening, and a conduit connecting said vessel opening to said water line, said conduit extending substantially vertically from said vessel to said water line.

3. A hypochlorite feeder for attachment to a water line comprising a closed vessel providing a chamber for reception of a hypochlorite as a calcium hypochlorite pellet, said vessel having only a single restricted opening therein, a conduit extending substantially vertically between said vessel and said water line and connecting said vessel and said line, said conduit being of substantially the same size as said opening, and a surge chamber in said conduit above said vessel and below said water line, said chamber having a cross section larger than the cross section of said conduit.

4. A hypochlorite feeder for attachment to a water line comprising a closed vessel providing a chamber for reception of a hypochlorite as a calcium hypochlorite pellet, said vessel having only a single restricted opening therein, a conduit extending substantially vertically between said vessel and said water line and connecting said vessel and said line, said conduit being of substantially the same size as said opening, and an orifice plate interposed in said conduit between said opening and said line to restrict flow from said vessel to that portion of the conduit above said plate, said portion providing a surge chamber for said vessel.

WALTER S. BACHMAN.